(12) United States Patent
Hu

(10) Patent No.: US 11,032,154 B2
(45) Date of Patent: *Jun. 8, 2021

(54) GRAPHICAL USER INTERFACE FOR DISPLAYING A HIERARCHICAL NETWORK TOPOLOGY IN A SINGLE SITE VIEW

(71) Applicant: Cisco Technology, Inc., San Jose, CA (US)

(72) Inventor: Yongmei Hu, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,278

(22) Filed: Dec. 21, 2018

(65) Prior Publication Data

US 2020/0204456 A1 Jun. 25, 2020

(51) Int. Cl.
*H04L 12/24* (2006.01)
*G06F 3/0481* (2013.01)

(52) U.S. Cl.
CPC .......... *H04L 41/22* (2013.01); *G06F 3/04812* (2013.01); *H04L 41/12* (2013.01)

(58) Field of Classification Search
CPC ...... H04L 41/22; H04L 41/12; G06F 3/04812
USPC ........................................................ 715/738
See application file for complete search history.

(56) References Cited

U.S. PATENT DOCUMENTS

| 7,194,538 | B1 * | 3/2007 | Rabe ................... G06F 3/0605 709/220 |
| 7,315,985 | B1 * | 1/2008 | Gauvin ................. H04L 41/12 715/734 |
| 7,519,700 | B1 * | 4/2009 | Sapsford ............... H04L 41/22 709/223 |
| 7,836,402 | B2 | 11/2010 | Martineau et al. |
| 7,974,219 | B2 * | 7/2011 | Strahan ................ H04L 41/12 370/254 |
| 9,106,555 | B2 | 8/2015 | Agarwal et al. |
| 9,258,195 | B1 * | 2/2016 | Pendleton ............. H04L 41/12 |
| 2004/0061701 | A1 * | 4/2004 | Arquie ................. H04L 41/12 345/440 |

(Continued)

OTHER PUBLICATIONS

McMullen, Kevin, "Using active networking to detect and troubleshoot issues in tactical data networks", Calhoun: The NPS Institutional Archive DSpace Repository, dated Jun. 2014, 92 pages.

*Primary Examiner* — Henry Orr
(74) *Attorney, Agent, or Firm* — Merchant & Gould P.C.

(57) ABSTRACT

A selection of a first site indicator associated with a first tab is detected in a computer-generated graphical user interface. An expanded view of the first tab depicting nodes at a first physical site is presented. A first node is determined to be linked to a second node. The first node represents a first internetworking device at the first physical site and the second node represents a first building unit at the first physical site. A first communication link between the first node and the second node is presented in the expanded view of the first tab. The first node is determined to be linked to a second physical site external to the first physical site. A second communication link between the first node and the second physical site is presented in the expanded view of the first tab. The second physical site is displayed in a collapsed view of a second tab adjacent to the expanded view of the first tab.

20 Claims, 5 Drawing Sheets

(56) References Cited

U.S. PATENT DOCUMENTS

| | | | |
|---|---|---|---|
| 2005/0179684 A1* | 8/2005 | Wallace | G06T 11/206 |
| | | | 345/419 |
| 2007/0044032 A1* | 2/2007 | Mollitor | H04L 41/145 |
| | | | 715/764 |
| 2007/0208840 A1* | 9/2007 | McConville | H04L 41/22 |
| | | | 709/223 |
| 2013/0042020 A1 | 2/2013 | Stiffler et al. | |
| 2013/0111374 A1* | 5/2013 | Hamilton | H04L 41/22 |
| | | | 715/763 |
| 2015/0103672 A1* | 4/2015 | Stuart | H04L 45/02 |
| | | | 370/241 |
| 2017/0017720 A1* | 1/2017 | Purusothaman | H04L 41/22 |
| 2017/0083585 A1* | 3/2017 | Chen | G06F 11/3452 |
| 2017/0315697 A1* | 11/2017 | Jacobson | G06F 16/26 |
| 2017/0358111 A1 | 12/2017 | Madsen | |
| 2019/0335300 A1* | 10/2019 | Viton | H04W 4/021 |

\* cited by examiner

GRAPHICAL USER INTERFACE FOR DISPLAYING A HIERARCHICAL NETWORK TOPOLOGY IN A SINGLE SITE VIEW

FIELD OF THE DISCLOSURE

One technical field of the present disclosure is network topology of computing and network resources in a computer-generated graphical user interface. Another technical field is display mechanism for monitoring and troubleshooting internetworking infrastructure elements.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The network topology is a topological structure of network resources that shows the arrangements and structural connections between network elements. The network topology may be depicted in a network topology map as nodes and links which represent network connection information. However, as the network grows, the number of nodes and the number of links increase, creating the challenges for presenting the network connection information in a single site view of the computer-generated graphical user interface.

To accommodate for the space of the new network elements, existing topology depicts the nodes in smaller sizes and links more densely in the network topology map, making it difficult to read or digest the connections between the nodes. Further, the existing topology produces topology maps that leave less space for the description of the nodes and links which can cause loss of information on the location of the nodes in relation to the other nodes, resulting in a failure in monitoring and troubleshooting the network elements.

BRIEF DESCRIPTION OF THE DRAWINGS

The example embodiment(s) of the present invention is illustrated by way of example, and not in a way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Embodiments are described in sections below according to the following outline:

General Overview

Techniques for displaying a network topology of computing and network resources in a graphical user interface are described. In one embodiment, a selection of a first site indicator that is associated with a first tab from a plurality of tabs associated with a network topology map is detected in a computer-generated graphical user interface. Presentation of an expanded view of the first tab depicting a first set of nodes at a first physical site is caused in response to detecting the selection of the first site indicator. A first node of the first set of nodes is determined to be linked to a second node of the first set of nodes where the first node represents a first internetworking device at the first physical site and the second node represents a first building unit at the first physical site.

Presentation of a first communication link between the first node and the second node is caused in the expanded view of the first tab in response to determining that the first node is linked to the second node. The first node is determined to be linked to a second physical site external to the first physical site via network communication. Presentation of a second communication link between the first node and the second physical site is caused in the expanded view of the first tab in the network topology map. The second physical site is displayed in a collapsed view of a second tab adjacent to the expanded view of the first tab in the computer-generated graphical user interface.

1. Architecture of a Hierarchical Network Topology

Figure 1:
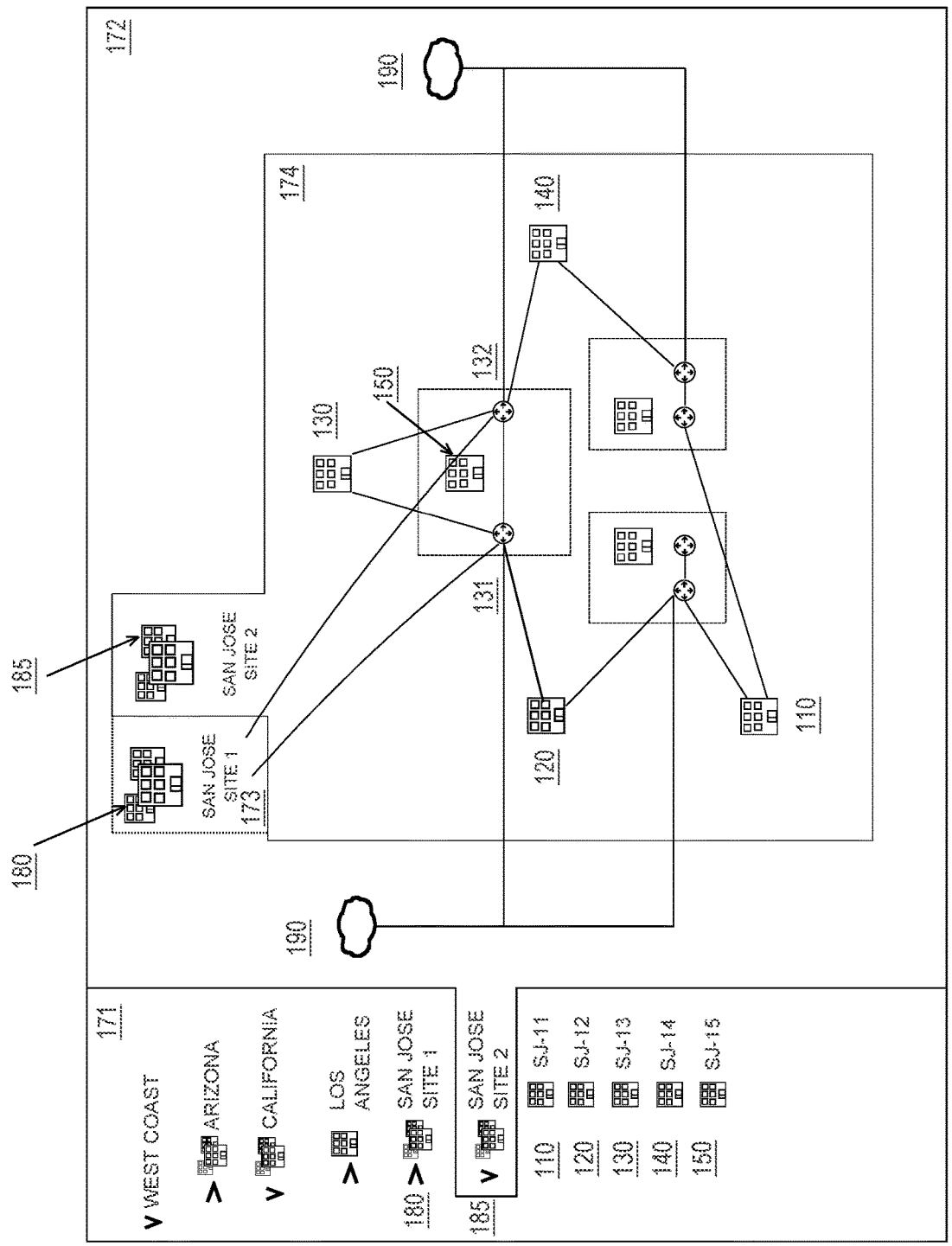
FIG. 1 illustrates an example structure of a hierarchical network architecture.

FIG. 1 illustrates an example architecture of a hierarchical network topology structure.

The example structure of FIG. 1 comprises a plurality of nodes representing physical sites 180, 185, a plurality of nodes representing building sites 110, 120, 130, 140, 150 and one or more nodes representing internetworking devices 131, 132. The network topology structure is stored in electronic digital computer memory and organized as one or more nodes representing internetworking infrastructure elements that are communicatively coupled within the computer network or the cloud. The physical sites may include local area networks, wide area networks (WAN), internetworks or internets. For example, the example structure of FIG. 1 displays WAN-accessing routers in a high-level campus WAN view. One or more building units can reside within the physical site and the building units may include one or more internetworking devices which may be associated with the building unit and the physical site. The internetworking device can include any of a router, a switch, or a gateway for a local network associated with the physical site and the building unit.

In some embodiments, a location panel 171 may be displayed on one side of the computer-generated graphical interface to list different physical sites that have building units. As illustrated in FIG. 1, the West Coast region may have an Arizona physical site and a California physical site. Each physical site can be represented as a site indicator. For example, the San Jose physical site 1 may be represented as a site indicator 180 and the San Jose physical site 2 may be represented as a site indicator 185. Each physical site may have one or more building units that are located within the physical site. For instance, within the San Jose site 2, the SJ-11 building is represented as a building icon 110, the SJ-12 building is represented as a building icon 120, the SJ-13 building is represented as a building icon 130, the SJ-14 building is represented as a building icon 140 and the SJ-15 building is represented as a building icon 150. Each building unit can be represented as a building icon and may be visually represented differently from the site indicators.

Upon detecting a selection of the site indicator 185, a map panel 172 is caused to be displayed in the computer-generated graphical user interface. The map panel 172 can be displayed adjacent to the location panel 171 and may include one or more tabs that are associated with the physical sites (e.g., San Jose 1, San Jose 2) which are in close proximity in the same region (e.g., San Jose). Each tab represents a corresponding physical site and may include a topology map for the corresponding physical site. For example, upon detecting the selection of the San Jose site 2, a first tab 174 is caused to be presented in the computer-generated user interface to show the network topology map for the San Jose physical site 2. In some embodiments, a second tab 173 may be presented in a collapsed view and may be presented adjacent to the first tab.

In the expanded view of the first tab 174, one or more building units 110, 120, 130, 140, 150 associated with the San Jose site 2 and the internetworking devices 131, 132 associated with the building units can be displayed within the graphical boundary of the expanded view of the first tab 174. The graphical boundary of the first tab 174 may be displayed clearly in the computer-generated graphical user interface that it is presented in a distinguishable manner from the other tabs 173 that are presented concurrently with the first tab 174.

In another embodiment, upon selecting the site indicator 180 for San Jose site 1 after selecting the site indicator 185, the first tab 174 is caused to be collapsed and the second tab 173 is caused to be expanded. In response to selecting the site indicator 180, the building units and associated internetworking devices that reside in the San Jose site 1 are depicted as nodes within the graphical boundary of the expanded view of the second tab 173 as a network topology map for the San Jose site 2.

A communication link can be displayed to show a network connection between the nodes. The communication link indicates a communication path that connects two or more nodes and supports data transmission. In some embodiments, the communication link can connect a node representing a physical site to a node representing an internetworking device to indicate a connection path between the physical site and the internetworking device. In one embodiment, the communication link can connect a node representing a building unit to a node representing an internetworking device to indicate a connection path between the building unit and the internetworking device. In another embodiment, the communication link can connect a node representing one internetworking device and a node representing another internetworking device to indicate a connection path between the internetworking devices. The communication link is caused to be highlighted concurrently with the connecting nodes in the network topology map.

As shown in FIG. 1, the communication link can connect a node representing a building unit to a node representing an associated internetworking device to indicate a connection path between the building unit and the internetworking device. For example, the internetworking device 132 may reside in SJ-15 and include a first connection with the building unit 130 and a second connection with the building unit 140. These communication links connect the internetworking device to different building units to show multiple connection paths between the internetworking device and a plurality of building units (e.g., internetworking device 132 to and from building unit 130 and internetworking device 132 to and from building unit 140). Both communication links can be visually highlighted with the connecting nodes that respectively represent the building units and the internetworking devices. The communication link connecting the building unit and the internetworking device may be visually depicted differently than the communication link between the physical site and the internetworking device.

In another embodiment, the communication link can connect a node representing a first internetworking device to a node representing a second internetworking device to indicate a connection path between the internetworking devices. The types of the internetworking devices can be identical or may differ. The communication link between the internetworking devices can be visually highlighted differently than the communication link between the physical site and the internetworking device or the communication link between the building unit and the internetworking device.

In some embodiments, a state indicator may be displayed with a node in the computer-generated graphical user interface. The state indicator measures a network communication status of the node to identify the quality of the connection of the node. The state indicator can be represented as three or more categories such as "poor," "fair," and "good." For example, the node with the "poor" state indicator may represent that the node's bandwidth is full which can make the node not optimal to receive or transmit the data. The node with the "good" state indicator may represent that the node's bandwidth is empty which can make the node optimal to receive or transmit the data. The node with the "fair" state indicator falls in-between "poor" and "good." Each category of state indicator may be represented in a different color that the user can easily identify the connection status of the node in the graphical user interface. Different category or color coding may be available depending on the interface configuration.

Network 190 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various network elements of FIG. 1. The various elements of FIG. 1 may also have direct (wired or wireless) communications links. The nodes and other elements of the system may each comprise an interface compatible with the network 190 and are programmed or configured to use standardized protocols for communication across the networks such as TCP/IP, and higher-layer protocols such as HTTP, TLS, and the like. In some embodiments, the network 190 may indicate a service provider network that provides circuits directly to the buildings for multiprotocol label switching or internet service.

2. Graphical Interface for Displaying the Nodes and the Links

Figure 2A:
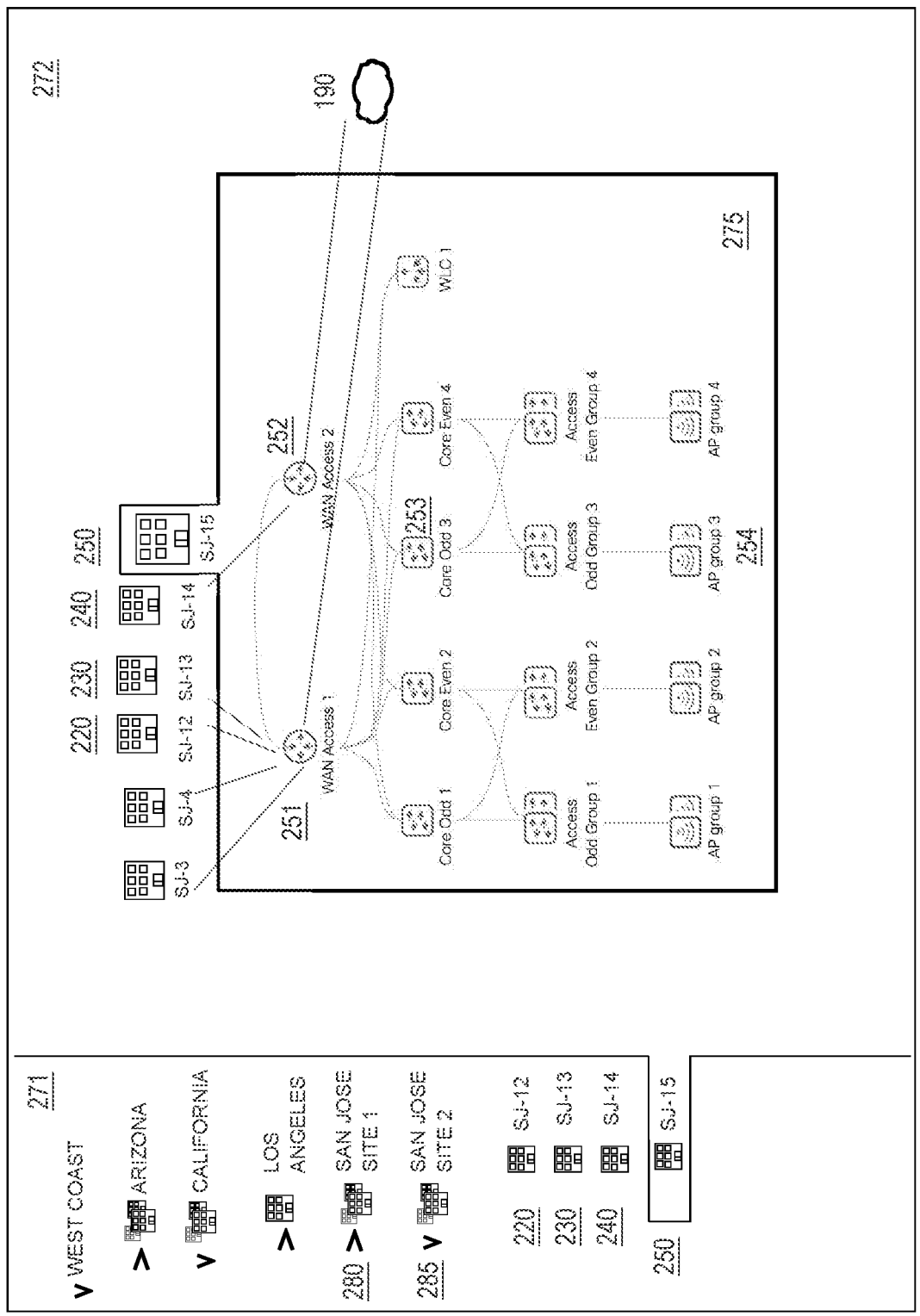
FIG. 2A illustrates an example computer-generated graphical interface for presenting the node hierarchy in the network topology map.

FIG. 2A illustrates an example computer-generated graphical interface for presenting the node hierarchy in the network topology map.

The example structure of FIG. 2A comprises a plurality of nodes representing building sites and a plurality of nodes representing internetworking devices. The computer-generated user interface may include the location panel 271 that may be displayed on one side of the graphical interface to list different building units 250, 230. As shown in the location panel 271, the San Jose site 2 includes SJ-15 building unit and SJ-13 building unit. Each building unit is represented as a building icon 250, 230 and some of the building icons can be displayed in the map panel 272. The user may click on an arrow-down symbol next to the site indicator 285 for San Jose site 2 to see the list of building units that reside in the San Jose site 2. In some embodiments, the building icons may be displayed differently from the site indicators 280, 285.

Upon detecting a selection of the building icon for SJ-15 building unit to see the network topology map for SJ-15, a map panel 272 may be caused to be displayed in the computer-generated graphical user interface. The map panel 272 may include an expanded view of a third tab 275 that has one or more internetworking devices 251, 252, 253, 254 that are associated with the SJ-15 building unit. The internetworking devices can include any of a router, a switch, or a gateway for a local network associated with the SJ-15 building unit. Each internetworking device may be depicted as different symbols from one another based on the type and the networking functions of the device. For example, the internetworking devices 251, 252 that connects to the SJ-15 building can be a router. The internetworking device 253 that connects to the router 252 can be a switch. The internetworking device 254 can be a wireless access point.

Upon determining that the internetworking device 251 is connected to one or more building units, a plurality of communication links may be caused to be displayed in the graphical interface. For example, as shown in an expanded view of the third tab 275, the internetworking device 251 has a first connection with the SJ-3 building in the San Jose site 1, a second connection with the SJ-4 building in the San Jose site 1, a third connection with the SJ-13 building in the San Jose site 2, and a fourth connection with the SJ-15 in the San Jose site 2. The plurality of communication links may overlay over the graphical boundary of the expanded third tab to indicate connections with building sites that are different from a currently-focused building site which is represented by the expanded tab. In some embodiments, the communication link may be partially displayed over the expanded view of the tab.

Networking devices may include one or more communication links that may be connected to other networking devices in the same building unit. In another embodiment, the networking devices may include one or more communication links that may be connected to different building units or different physical sites.

Figure 2B:
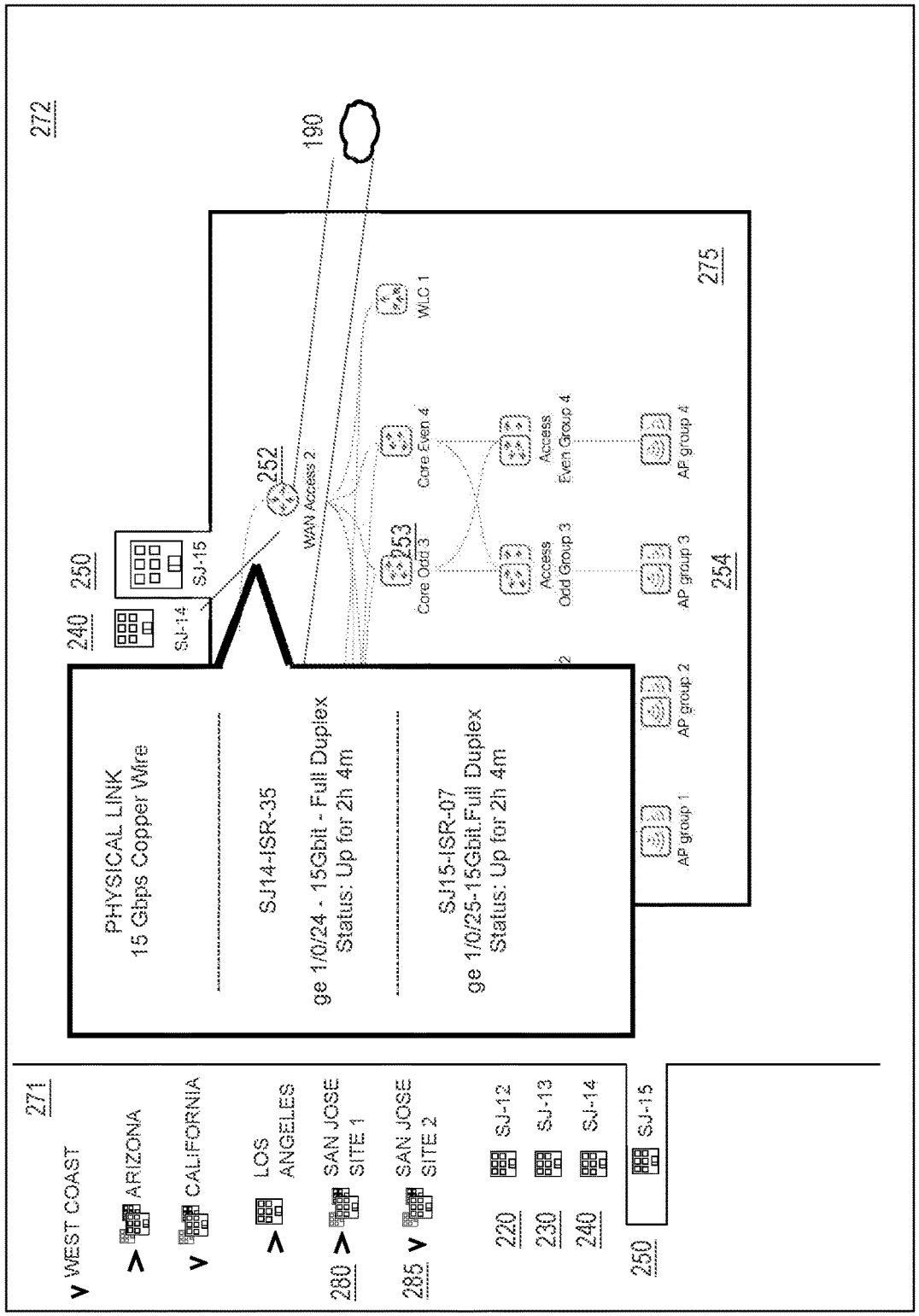
FIG. 2B illustrates an example computer-generated graphical interface for presenting transmission information of the links.

FIG. 2B illustrates an example graphical interface presenting transmission information for the links.

In some embodiments, upon detecting a selection of a link in the expanded view of the tab, the transmission information 279 may be caused to be displayed in another window that overlays over the expanded view of the tab. For example, the user can hover over a particular link or select the particular link in the graphical user interface (e.g., by clicking the link) to view the transmission information of the link. It allows the user to determine the status of the link and identify the optimal communication path. In some embodiments, the data transmission path may be selected based on the transmission information that includes the bandwidth of various elements that connects the internetworking devices or links.

The transmission information can include the name of the device (e.g., SJ15-ISR-35) and information about the communication link such as the type of the communication link, an interface port number (e.g., ge 1/0/24), the transmission speed of the link (e.g., 15 Gbps), the physical link information (e.g., copper wire) or the connection time of the link (e.g., up for two hours). In some embodiments, the user can hover over a particular node or select the particular node to view the transmission information of the nodes. The transmission information can be available for a particular node that the user hovers over or selects. The transmission information listed herein is not the exclusive list and may include other types of information.

Each node may include respective storage which may comprise electronic digital memory, non-volatile storage such as FLASH RAM, disk storage or other suitable digital storage. While nodes are shown to illustrate a clear example, other embodiments may use any number of nodes each having the elements shown in FIG. 2B for nodes.

For purposes of illustrating a clear example, the node and its components have been described with certain functions, but the same operations can be performed using node and others that may be used in a distributed computer system in a practical embodiment.

3. Example Processes and Algorithms

Figure 3:
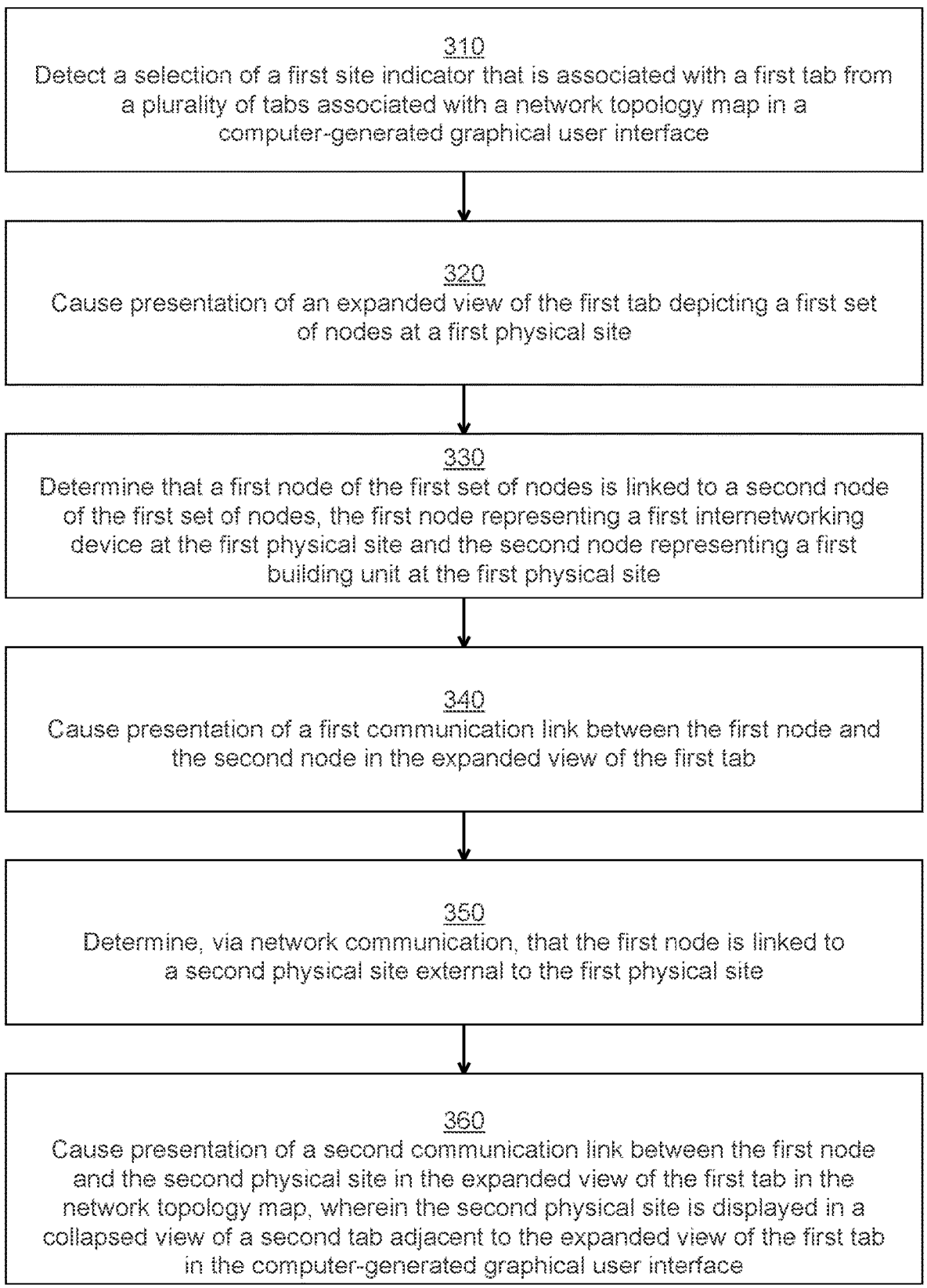
FIG. 3 illustrates an example flow diagram of a process for displaying the network topology map.

FIG. 3 illustrates an example flow diagram of a process for displaying a network topology map in a graphical user interface. FIG. 3 is intended to disclose an algorithm or functional description that may be used as a basis of writing computer programs to implement the functions that are described herein, and which cause a computer to operate in the new manner that is disclosed herein. The steps of the process may be performed in any order and are not limited to the order shown in FIG. 3.

At step 310, a selection of a first site indicator that is associated with a first tab is detected in a computer-generated graphical user interface. The first tab is from a plurality of tabs that is associated with a network topology map. Each of the plurality of tabs corresponds to a physical site that has one or more building units and one or more internetworking devices. The network topology map includes a location panel that displays site indicators representing various physical sites and a map panel that displays one or more nodes representing various internetworking infrastructure elements.

At step 320, in response to detecting the selection of the first site indicator, presentation of an expanded view of the first tab depicting a first set of nodes at a first physical site is configured to be caused. The selection of the first indicator can cause the map panel with the selected physical site network topology map to be displayed in the computer-generated graphical user interface. The expanded view of the first tab is caused to display a graphical boundary that represents a geographic boundary of the first physical site. The first node of the first set of nodes may be depicted in the expanded view of the first tab as internal to the graphical boundary and the first site indicator is depicted as external to the graphical boundary.

At step 330, a first node is determined to be linked to a second node where the first node represents a first internetworking device at the first physical site and the second node represents a first building unit at the first physical site. When the first node is determined to be linked to the second node, it is determined that a communication path between the first node and the second node is available. The communication path facilitates a data packet to travel through the link within the network. The data transmission path may be selected based on the bandwidth of the internetworking devices or links.

At step 340, in response to determining that the first node is linked to the second node, presentation of a first communication link between the first node and the second node is caused in the expanded view of the first tab. The first communication link may be overlaid over the graphical boundary of the first tab. The first communication link may be highlighted concurrently with the first node and the second node to indicate an available communication path between the first node and the second node. The network topology map may be displayed in a single-site view in order to display all the hierarchical network topology structure that is currently on-focus.

In some embodiments, the user may select or hover over the first node in the expanded view of the first tab. Upon detecting the selection of the first node, transmission information can be received from the first node. The transmission information may include a transmission status, a transmission speed, or associated ports. Other transmission information of the node may be available based on the node or the interface setting.

At step 350, the first node is further determined to be linked to a second physical site external to the first physical site via network communication. The second physical site may be proximate to the first physical site in the same region, causing the second tab representing the second physical site to be displayed adjacent to the first tab representing the first physical site.

At step 360, presentation of a second communication link between the first node and the second physical site is caused in the expanded view of the first tab in the network topology map. The second physical site is displayed in a collapsed view of a second tab adjacent to the expanded view of the first tab in the computer-generated graphical user interface. The second communication link may be overlaid over the collapsed view of the second tab and the expanded view of the first tab.

In another embodiment, it may be determined that the first node is linked to a second building unit of the second physical site via network communication. Upon determining that the first node is linked to the second building of the second physical site, a third communication link may be caused to be displayed to connect the first node and the second building unit in the expanded view of the first tab. The second building unit may be displayed in a collapsed view of a third tab adjacent to the expanded view of the first tab in the graphical user interface.

Using these approaches, hierarchical networking elements can be displayed in a digestible way in a single-view display. These approaches have the benefit of allowing users to easily understand the connection of the networking elements in details despite the diversified association between nodes located in different sites. Using the single-site graphical interface with selectable expanded and collapsed tabs prevents loss of connection and transmission information when networking elements are connected to buildings or physical sites outside of the associated building or physical site. The approach disclosed herein can simplify the connection information for monitoring the networking equipment and diagnosing and troubleshooting the network issues. These approaches can permit the users to view the association of the nodes and identify the optimal communication path for data transmission.

4. Implementation Mechanisms-Hardware Overview

Figure 4:
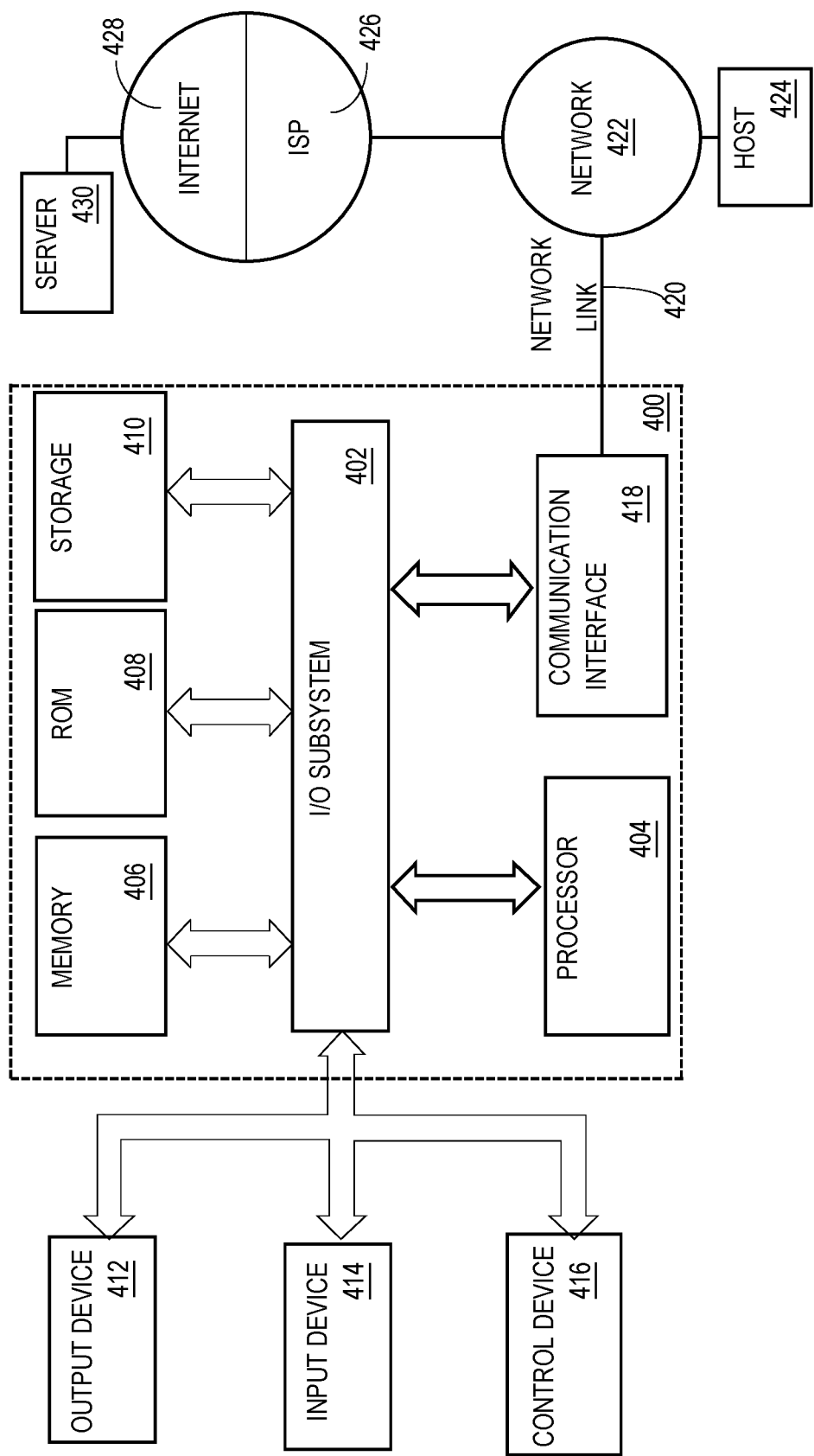
FIG. 4 illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method comprising:
detecting a selection of a first site indicator that is associated with a first tab from a plurality of tabs associated with a network topology map in a computer-generated graphical user interface;
in response to detecting the selection of the first site indicator, causing presentation of an expanded view of the first tab depicting a first set of nodes at a first physical site;
determining that a first node of the first set of nodes is linked to a second node of the first set of nodes, the first node representing a first internetworking device at the first physical site and the second node representing a first building unit at the first physical site;
in response to determining that the first node is linked to the second node, causing presentation of a first communication link between the first node and the second node in the expanded view of the first tab;
determining, via network communication, that the first node is linked to a second physical site external to the first physical site;
causing presentation of a second communication link between the first node and the second physical site in the expanded view of the first tab in the network topology map, wherein the second physical site is displayed in a collapsed view of a second tab adjacent to the expanded view of the first tab in the computer-generated graphical user interface, wherein the first communication link connecting the first node representing the first internetworking device at the first physical site and the second node representing the first building unit at the first physical site is presented visually differently than the second communication link between the first node representing the first internetworking device at the first physical site and the second physical site, wherein the first building unit represents a plurality of inter-networking devices located in a building site, wherein the expanded view of the first tab comprises a graphical boundary that represents a geographic boundary of the first physical site, wherein the first node is depicted in the expanded view as internal to the graphical boundary, wherein the first site indicator is depicted as external to the graphical boundary, and wherein presenting the first communication link comprises causing the first communication link to overlay the graphical boundary.

2. The computer-implemented method of claim 1, further comprising:
detecting a selection of the first node in the expanded view of the first tab;
receiving, from the first node, transmission information of the first node;
causing presentation of transmission information in the expanded view of the first tab, the transmission information comprising a transmission status and a transmission speed.

3. The computer-implemented method of claim 1, further comprising causing presentation of a first state indicator associated with the first node, the first state indicator representing a network communication status of the first node.

4. The computer-implemented method of claim 1, further comprising causing the first communication link to be highlighted concurrently with the first node and the second node in the network topology map.

5. The computer-implemented method of claim 1, wherein the first internetworking device represents any of a router, a switch, or a gateway for a first local network associated with the first physical site.

6. The computer-implemented method of claim 1, wherein each of the plurality of tabs corresponds to a physical site that has one or more internetworking devices and one or more building units.

7. The computer-implemented method of claim 1, further comprising:
determining, via network communication, that the first node is linked to a second building unit of the second physical site; and
causing presentation of a third communication link between the first node and the second building unit in the expanded view of the first tab in the network topology map, wherein the second building unit is displayed in a collapsed view of a third tab adjacent to the expanded view of the first tab in the computer-generated graphical user interface.

8. A system comprising:
a memory; and
a processor communicatively coupled to the memory, wherein the processor is operative to:
detect a selection of a first site indicator that is associated with a first tab from a plurality of tabs associated with a network topology map in a computer-generated graphical user interface;
in response to detecting the selection of the first site indicator, cause presentation of an expanded view of the first tab depicting a first set of nodes at a first physical site;
determine that a first node of the first set of nodes is linked to a second node of the first set of nodes, the first node representing a first internetworking device at the first physical site and the second node representing a first building unit at the first physical site;
in response to determining that the first node is linked to the second node, cause presentation of a first communication link between the first node and the second node in the expanded view of the first tab;
determine, via network communication, that the first node is linked to a second physical site external to the first physical site; and
cause presentation of a second communication link between the first node and the second physical site in the expanded view of the first tab in the network topology map, wherein the second physical site is displayed in a collapsed view of a second tab adjacent to the expanded view of the first tab in the computer-generated graphical user interface, wherein the first communication link connecting the first node representing the first internetworking device at the first physical site and the second node representing the first building unit at the first physical site is presented visually differently than the second communication link between the first node representing the first internetworking device at the first physical site and the second physical site, wherein the first building unit represents a plurality of inter-networking devices located in a building site, wherein the expanded view of the first tab comprises a graphical boundary that represents a geographic boundary of the first physical site, wherein the first node is depicted in the expanded view as internal to the graphical boundary, wherein the first site indicator is depicted as external to the graphical boundary, and wherein presenting the first communication link comprises causing the first communication link to overlay the graphical boundary.

9. The system of claim 8, wherein the processor is further operative to:
  detect a selection of the first node in the expanded view of the first tab;
  receive, from the first node, transmission information of the first node; and
  cause presentation of transmission information in the expanded view of the first tab, the transmission information comprising a transmission status and a transmission speed.

10. The system of claim 8, wherein the processor is further operative to cause presentation of a first state indicator associated with the first node, the first state indicator representing a network communication status of the first node.

11. The system of claim 8, wherein the processor is further operative to cause the first communication link to be highlighted concurrently with the first node and the second node in the network topology map.

12. The system of claim 8, wherein the first internetworking device represents any of a router, a switch, or a gateway for a first local network associated with the first physical site.

13. The system of claim 8, wherein each of the plurality of tabs corresponds to a physical site that has one or more internetworking devices and one or more building units.

14. The system of claim 8, wherein the processor is further operative to:
  determine, via network communication, that the first node is linked to a second building unit of the second physical site; and
  cause presentation of a third communication link between the first node and the second building unit in the expanded view of the first tab in the network topology map, wherein the second building unit is displayed in a collapsed view of a third tab adjacent to the expanded view of the first tab in the computer-generated graphical user interface.

15. A non-transitory computer-readable media storing instructions, wherein the instructions, when executed by one or more processors, cause to:
  detect a selection of a first site indicator that is associated with a first tab from a plurality of tabs associated with a network topology map in a computer-generated graphical user interface;
  in response to detecting the selection of the first site indicator, cause presentation of an expanded view of the first tab depicting a first set of nodes at a first physical site;
  determine that a first node of the first set of nodes is linked to a second node of the first set of nodes, the first node representing a first internetworking device at the first physical site and the second node representing a first building unit at the first physical site;
  in response to determining that the first node is linked to the second node, cause presentation of a first communication link between the first node and the second node in the expanded view of the first tab;
  determine, via network communication, that the first node is linked to a second physical site external to the first physical site; and
  cause presentation of a second communication link between the first node and the second physical site in the expanded view of the first tab in the network topology map, wherein the second physical site is displayed in a collapsed view of a second tab adjacent to the expanded view of the first tab in the computer-generated graphical user interface, wherein the first communication link connecting the first node representing the first internetworking device at the first physical site and the second node representing the first building unit at the first physical site is presented visually differently than the second communication link between the first node representing the first internetworking device at the first physical site and the second physical site, wherein the first building unit represents a plurality of inter-networking devices located in a building site, wherein the expanded view of the first tab comprises a graphical boundary that represents a geographic boundary of the first physical site, wherein the first node is depicted in the expanded view as internal to the graphical boundary, wherein the first site indicator is depicted as external to the graphical boundary, and wherein presenting the first communication link comprises causing the first communication link to overlay the graphical boundary.

16. The non-transitory computer-readable media of claim 15, wherein the instructions, when executed by one or more processors, further cause to:
  detect a selection of the first node in the expanded view of the first tab;
  receive, from the first node, transmission information of the first node; and
  cause presentation of transmission information in the expanded view of the first tab, the transmission information comprising a transmission status and a transmission speed.

17. The non-transitory computer-readable media of claim 15, wherein the instructions, when executed by one or more processors, further cause presentation of a first state indicator associated with the first node, the first state indicator representing a network communication status of the first node.

18. The non-transitory computer-readable media of claim 15, wherein the instructions, when executed by one or more processors, further cause the first communication link to be highlighted concurrently with the first node and the second node in the network topology map.

19. The non-transitory computer-readable media of claim 15, wherein the first internetworking device represents any of a router, a switch, or a gateway for a first local network associated with the first physical site.

20. The non-transitory computer-readable media of claim 15, wherein each of the plurality of tabs corresponds to a physical site that has one or more internetworking devices and one or more building units.

* * * * *